United States Patent
Cheung

(10) Patent No.: US 9,391,817 B2
(45) Date of Patent: Jul. 12, 2016

(54) METHOD AND APPARATUS OF AN ARCHITECTURE TO SWITCH EQUALIZATION BASED ON SIGNAL DELAY SPREAD

(71) Applicant: Tensorcom, Inc., Carlsbad, CA (US)

(72) Inventor: Ricky Lap Kei Cheung, San Diego, CA (US)

(73) Assignee: Tensorcom, Inc., Carlsbad, CA (US)

( * ) Notice: Subject to any disclaimer, the term of this patent is extended or adjusted under 35 U.S.C. 154(b) by 26 days.

(21) Appl. No.: 14/223,516

(22) Filed: Mar. 24, 2014

(65) Prior Publication Data

US 2015/0270993 A1  Sep. 24, 2015

(51) Int. Cl.
| | |
|---|---|
| H03H 7/30 | (2006.01) |
| H03H 7/40 | (2006.01) |
| H03K 5/159 | (2006.01) |
| H04L 25/03 | (2006.01) |
| H04L 27/26 | (2006.01) |
| H04L 25/02 | (2006.01) |

(52) U.S. Cl.
CPC .... *H04L 25/03159* (2013.01); *H04L 25/03019* (2013.01); *H04L 27/2601* (2013.01); *H04L 25/0212* (2013.01); *H04L 2025/03414* (2013.01)

(58) Field of Classification Search
CPC .................. H04L 25/03159; H04L 25/03019; H04L 27/2601; H04L 25/03006; H04L 25/03012
USPC ......... 375/350, 346, 229, 230, 231, 232, 285, 375/348; 455/557, 343.1
See application file for complete search history.

(56) References Cited

U.S. PATENT DOCUMENTS

| | | | |
|---|---|---|---|
| 6,938,196 B2 | 8/2005 | Richardson et al. | |
| 7,133,853 B2 | 11/2006 | Richardson et al. | |
| 7,281,192 B2 | 10/2007 | Shen et al. | |
| 7,397,871 B2* | 7/2008 | Wiss et al. | 375/340 |
| 7,631,241 B2 | 12/2009 | Park et al. | |
| 7,673,223 B2 | 3/2010 | Richardson et al. | |
| 2005/0143125 A1* | 6/2005 | Maltsev et al. | 455/557 |
| 2006/0128348 A1* | 6/2006 | Jang | 455/343.1 |
| 2012/0314750 A1* | 12/2012 | Mehrabani | 375/229 |
| 2014/0016677 A1* | 1/2014 | Dua et al. | 375/148 |

OTHER PUBLICATIONS

"LDPC decoder architecture for high-data rate personal-area networks", Weiner, M. ; Nikolic, B. ; Zhengya Zhang Circuits and Systems (ISCAS), 2011 IEEE International Symposium on Digital Object Identifier: 10.1109 ISCAS.2011.5937930 Publication Year: 2011 , pp. 1784-1787.

(Continued)

*Primary Examiner* — Phuong Phu
(74) *Attorney, Agent, or Firm* — Steven J Shattil

(57) ABSTRACT

The 60 GHz channel between the transmitter and receiver can have AWGN characteristics allowing a Time Domain Equalizer (TDE) to be used at the receiver instead of a Frequency Domain Equalizer (FDE). The complexity of performing matrix inversion on a received signal is reduced when directional antennas are used in a 60 GHz system. Incorporating the TDE in place of the FDE saves almost an order of magnitude in power dissipation. For portable units, such a savings is beneficial since the battery life can be extended. The signal quality of wireless channel is based on the characteristics of the received signal to switch the equalization operation from a system performing FDE to TDE and vice versa. The receiver adapts to the received signal to reduce the power dissipation of the system.

17 Claims, 10 Drawing Sheets

(56) References Cited

OTHER PUBLICATIONS

"A Reduced-Complexity Architecture for LDPC Layered Decoding Schemes", Sangmin Kim ; Sobelman, G.E. ; Hanho Lee, Very Large Scale Integration (VLSI) Systems, IEEE Transactions on vol. 19 , Issue: 6 Digital Object Identifier: 10.1109/TVLSI.2010.2043965 Publication Year: 2011 , pp. 1099-1103.

"Panasonic Develops Industry's Lowest Power Consumption* Chipset of Less Than 1-Watt for Multi-gigabit Millimeter Wave Wireless Communication", Press Release, Panasonic Corporation, Mar. 19, 2012, p. 1-4.

"A 7Gb/s SC-FDE/OFDM MMSE equalizer for 60GHz wireless communications", Hsiao, F. ; Tang, A. ; Yang, D. ; Pham, M. ; Chang, M.-C.F., Solid State Circuits Conference (A-SSCC), 2011 IEEE Asian , Digital Object Identifier: 10.1109/ASSCC.2011.6123570, Publication Year: 2011 , pp. 293-296.

"Design of efficient radix-8 butterfly PEs for VLSI", Widhe, T. ; Melander, J. ; Wanhammar, L. Circuits and Systems, 1997. ISCAS '97., Proceedings of 1997 IEEE International Symposium on vol. 3 Digital Object Identifier: 10.1109/ISCAS.1997.621567 Publication Year: 1997 , pp. 2084-2087 vol. 3.

* cited by examiner

|  | TDE | FDE |
|---|---|---|
| Average Power measured in data field excluding Phase Noise Estimation and Compensation | 15mW | 125mW |
| Average Power measured in data field including Phase Noise Estimation and Compensation | 30mW | 140mW |
| Average power for coefficient generation | 30mW | 50mW |
| Area of the datapath | 41k gate | 400k gate |
| Area for coefficient generation | 404k gate | - |
| Supported MCS | MCS1-9,25-31 | MCS1-9,25-31 |
| Core Clock | 440MHz | 440MHz |
| Maximum Supported Throughput | 2.5Gbps | 2.5Gbps |
| Maximum supported rms delay spread | 2ns | 36.4ns |

METHOD AND APPARATUS OF AN ARCHITECTURE TO SWITCH EQUALIZATION BASED ON SIGNAL DELAY SPREAD

CROSS-REFERENCE TO OTHER APPLICATIONS

The U.S. application Ser. No. 14/192,725 entitled "Method and Apparatus of a Fully-Pipelined FFT" filed on Feb. 27, 2014, and Ser. No. 14/165,505 entitled "Method and Apparatus of a Fully-Pipelined Layered LDPC Decoder" filed on Jan. 27, 2014, which are invented by at least one common inventor and assigned to the same assignee as the present application and incorporated herein by reference in its entirety.

BACKGROUND OF THE INVENTION

Federal Communications Commission (FCC) has allotted a spectrum of bandwidth in the 60 GHz frequency range (57 to 64 GHz). The Wireless Gigabit Alliance (WiGig) is targeting the standardization of this frequency band that will support data transmission rates up to 7 Gbps. Integrated circuits, formed in semiconductor die, offer high frequency operation in this millimeter wavelength range of frequencies. Some of these integrated circuits utilize Complementary Metal Oxide Semiconductor (CMOS), Silicon-Germanium (SiGe) or GaAs (Gallium Arsenide) technology to form the dice in these designs. The receive path of the signal being transferred in the wireless channel in these communication system need to be compensated for various very dispersive conditions occurring in the wireless channel. Some of these conditions include multipath reflection, multipath resilience, ISI (Inter Symbol Interference), channel capacity, strategies for frequency diversity scheduling, etc. This standard is called the IEEE 802.11 ad protocol.

CMOS (Complementary Metal Oxide Semiconductor) is the primary technology used to construct integrated circuits. N-channel devices and P-channel devices (MOS device) are used in this technology which uses fine line technology to consistently reduce the channel length of the MOS devices. Current channel lengths are 40 nm, the power supply of VDD equals 1.2V and the number of layers of metal levels can be 8 or more.

CMOS offers the computing power to perform many of the required compensation techniques requires overcoming the adverse conditions of the wireless channel. Yet, the computing power must be used in a power efficient manner to insure that the dissipated power is low enough to allow these important building blocks of the transceiver fabricated in CMOS to be used in mobile applications. This helps to insure that the energy drawn from the limited power contained in the battery is minimized while achieving the optimum performance.

Orthogonal frequency division multiplexing (OFMA) is a multi-carrier system that has been used in various communication Standards such as 802.11 (Wi-Fi), digital video broadcasting (DVB), asymmetrical digital subscriber lines (ASDL), etc. However, OFDM suffers from several deficiencies including peak to average power ratio (PAPR), sensitivity to amplifier nonlinearities, and effects of frequency offsets. Single carrier (SC) communication systems, however, overcome these several deficiencies and offer several benefits over OFDM systems.

SC communication systems is a single-carrier transmit signal that partitions their wideband channel into a large number of parallel narrowband subcarriers and has a lower PAPR resulting in design parameters in the transmit path that are simpler to achieve when compared to OFDM.

The block diagram 1-1 represents a digital radio baseband system coupled to an RF transceiver as illustrated in FIG. 1A. The input signals are mapped 1-2 into symbols, then the symbols are converted from a serial path into parallel blocks with a series to parallel (S/P) converter 1-3 so a cyclic prefix 1-4 can be added to each block. A parallel to serial (P/S) converter 1-5 recombines these blocks into a serial link which is zero padded and filtered 1-6. A digital to analog (D/A) converter 1-7 converts the digital serial link to an analog signal and presented to an analog transmitter 1-8. The signal is sent over the wireless channel 1-9 which time disperses the signal and introduces noise 1-21 into the signal. A receiver front end 1-10 receives and converts the distorted wireless signal to a digital signal with an analog to digital (A/D) converter 1-11. The signal is then filtered 1-12. The prefix is removed 1-13 and a S/P converter 1-14 generates a time domain of parallel block signals that are converter by an fast Fourier transform (FFT) 1-15 in to the frequency domain. A frequency domain equalizer 1-16 is applied to each of the transmitted subcarriers where the channel distortion caused by the channel is compensated for each subcarrier by the frequency domain equalizer. The FFT and frequency domain equalization requires less computation power than an equivalent performing time-domain equalization. An inverse FFT (IFFT) 1-17 generates the time domain representation of the frequency compensated transmitted signal to a de-mapper unit 1-18 after which the signal is applied to a P/S converter 1-19. The output signal is applied to the baseband circuitry of the receiver to extract the signals from the transmitter. The combination of the FFT, FDE and IFFT is contained within the dotted box 1-20 and will be described in more detail shortly.

In the block diagram 1-21 as illustrated in FIG. 1B, the input signals are mapped 1-2 into symbols, then the symbols are converted from a serial path into parallel blocks with a series to parallel (S/P) converter 1-3 so a cyclic prefix 1-4 can be added to each block. A parallel to serial (P/S) converter 1-5 recombines these blocks into a serial link which is zero padded and filtered 1-6. A digital to analog (D/A) converter 1-7 converts the digital serial link to an analog signal and presented to an analog transmitter 1-8. The signal is sent over the wireless channel 1-9 which time disperses the signal and introduces noise 1-21 into the signal. A receiver front end 1-10 receives the distorted wireless signal and converted to a digital signal with an analog to digital (A/D) converter 1-11. The signal is then filtered 1-12. The prefix is removed 1-13 and a S/P converter 1-14 generates a time domain of parallel block signals that are applied to a time domain equalizer (TDE) 1-22 in the time domain. The time domain representation of the signal is sent to a de-mapper unit 1-18 after which the signal is applied to a P/S converter 1-19. The output signal is applied to the remainder of the baseband circuitry of the receiver to extract the signals from the transmitter. The TDE contained within the dotted box 1-22 and will be described in more detail shortly.

BRIEF SUMMARY OF THE INVENTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

An inventive embodiment of one of the inventions is reducing the complexity of performing matrix inversion on a received signal when directional antennas are used in a 60 GHz system. The 60 GHz channel between the transmitter and receiver can have AWGN characteristics allowing a Time Domain Equalizer (TDE) to be used at the receiver instead of a Frequency Domain Equalizer (FDE). Incorporating the TDE in place of the FDE saves almost an order of magnitude in power dissipation. For portable units, such a savings is beneficial since the battery life can be extended.

Another inventive embodiment of one of the inventions is determining the signal quality of wireless channel using Error Vector Magnitude (EVM) and based on the characteristics of the received signal (delay spread, error rate, etc.) to switch the equalization operation from a system performing FDE to TDE and visa versa. Thus, based on the quality of the signal, the receiver adapts to the received signal to reduce the power dissipation of the system.

Another inventive embodiment of one of the inventions is combining the Equalizing switching along with the switching between the two modes of error detection: Low Density Parity Check (LDPC) and a Maximum Likelihood Block (ML). This provides versatility in the decoding of the signal.

One of the innovated embodiments of this invention is to determine the quality of the signal and issue a control signal to perform a different function. For example, one embodiment is to transfer a signal being processed by a first sub-system block and switch that signal to be processed by a second sub-system block. Another embodiment is to process a signal by both a first sub-system block and a second sub-system block switch, then based on the signal's characteristics switch to the sub-system block that offers better features. Yet another embodiment is to turn off the power being applied to a first sub-system block and enable the power applied to a second sub-system block; thereby, minimizing power dissipation in the system. Yet another embodiment is to disable a first transistor in an analog circuit and enable a second transistor in the same analog circuit to reduce current flow, yet still allowing the analog circuit to perform at the optimum level of performance. Many embodiments can be developed using this innovative technique where a captured channel signal is sensed to be free of multipath signals and used to switch, enable, disable, etc. various functions within the system that extracts information from the channel signal; yet achieve significant benefits without compromising the quality of the captured channel signal.

Another embodiment of one of the present inventions is an apparatus for selecting one of two blocks comprising: an input signal coupled to an input node of a first block and a second block, wherein the input signal processed by the first block generates a measurable characteristic; and a first switch configured to disable or enable the second block from drawing power from a power supply if the measurable characteristic at an output node of the first block has a first parameter less than or equal to a first value, wherein the first switch is either a series transistor coupling the second block to the power supply or a clocked logic gate clocking the second block, wherein the first block is a time domain equalization (TDE) block and the second block is a frequency domain equalization (FDE) block. The apparatus further comprising: a second switch configured to disable or enable the first block from drawing power from the power supply, wherein if the measurable characteristic at the output node of the first block has the first parameter more than the first value, then enable the first switch of the second block to draw power from the power supply and disable the second switch of the first block from drawing power from the power supply, wherein an Error Vector Magnitude (EVM) is the measurable characteristic, the first parameter is a measured error, and the first value is 1%, wherein a delay spread is the measurable characteristic, the first parameter is time, and the first value is 3 ns, wherein the delay spread of the input signal is reduced by using at least one directional antenna.

Another embodiment of one of the present inventions is an apparatus for selecting one of two blocks comprising: an input signal coupled to an input node of a first block and a second block, wherein the input signal processed by the first block generates a measurable characteristic; and a first switch configured to disable or enable the power coupled to the second block if the measurable characteristic of an Error Vector Magnitude (EVM) at an output of the first block indicates a delay spread less than or equal to 3 ns, wherein the first switch is either a series transistor coupling the second block to the power supply or a clocked logic gate clocking the second block, wherein the first block is a time domain equalization (TDE) block and the second block is a frequency domain equalization (FDE) block. The apparatus further comprising: a second switch configured to disable or enable the first block from drawing power from a power supply, wherein if the measurable characteristic of the EVM at the output node of the first block has the delay spread more than the 3 ns, then enable the first switch of the second block to draw power from the power supply and disable the second switch of the first block from drawing power from the power supply, wherein the delay spread is determined after the first block performs a computation using a channel estimation field and a physical layer convergence procedure (PLCP) header within a packet of the input signal, wherein the delay spread of the input signal is reduced by using at least one directional antenna, wherein the delay spread of the input signal is reduced by using a focused beam antenna system.

Another embodiment of one of the present inventions is a method to reduce power dissipation comprising the steps of: coupling an input signal to an input node of a first block and a second block; measuring a characteristic of the input signal after being processed by the first block; and disabling the power coupled to the second block if an Error Vector Magnitude (EVM) of the characteristic has an error of less than or equal to 1%, wherein the first block is a time domain equalization (TDE) block and the second block is a frequency domain equalization (FDE) block, wherein if the EVM of the characteristic has the error more than 1%, then enable the second block to draw power from the power supply and disable the first block from drawing power from the power supply. The method wherein the enable and the disable are adapted to be performed by a switch, wherein the switch is a series transistor coupling the second equalization block to the power supply or a clocked logic gate clocking the second block. The method wherein a delay spread is determined after the first block performs a computation using a channel estimation field and a physical layer convergence procedure (PLCP) header within a packet of the input signal, wherein the delay spread of the input signal is reduced by using at least one directional antenna.

BRIEF DESCRIPTION OF THE DRAWINGS

Please note that the drawings shown in this specification may not necessarily be drawn to scale and the relative dimensions of various elements in the diagrams are depicted schematically. The inventions presented here may be embodied in many different forms and should not be construed as limited to the embodiments set forth herein. Rather, these embodiments are provided so that this disclosure will be through and complete, and will fully convey the scope of the invention to those skilled in the art. In other instances, well-known structures and functions have not been shown or described in detail to avoid unnecessarily obscuring the description of the embodiment of the invention. Like numbers refer to like elements in the diagrams.

FIG. 5 shows a table comparing various parameters of the TDE and FDE in accordance with an embodiment of one of the present invention.

DETAILED DESCRIPTION OF THE INVENTION

Figure 1A:
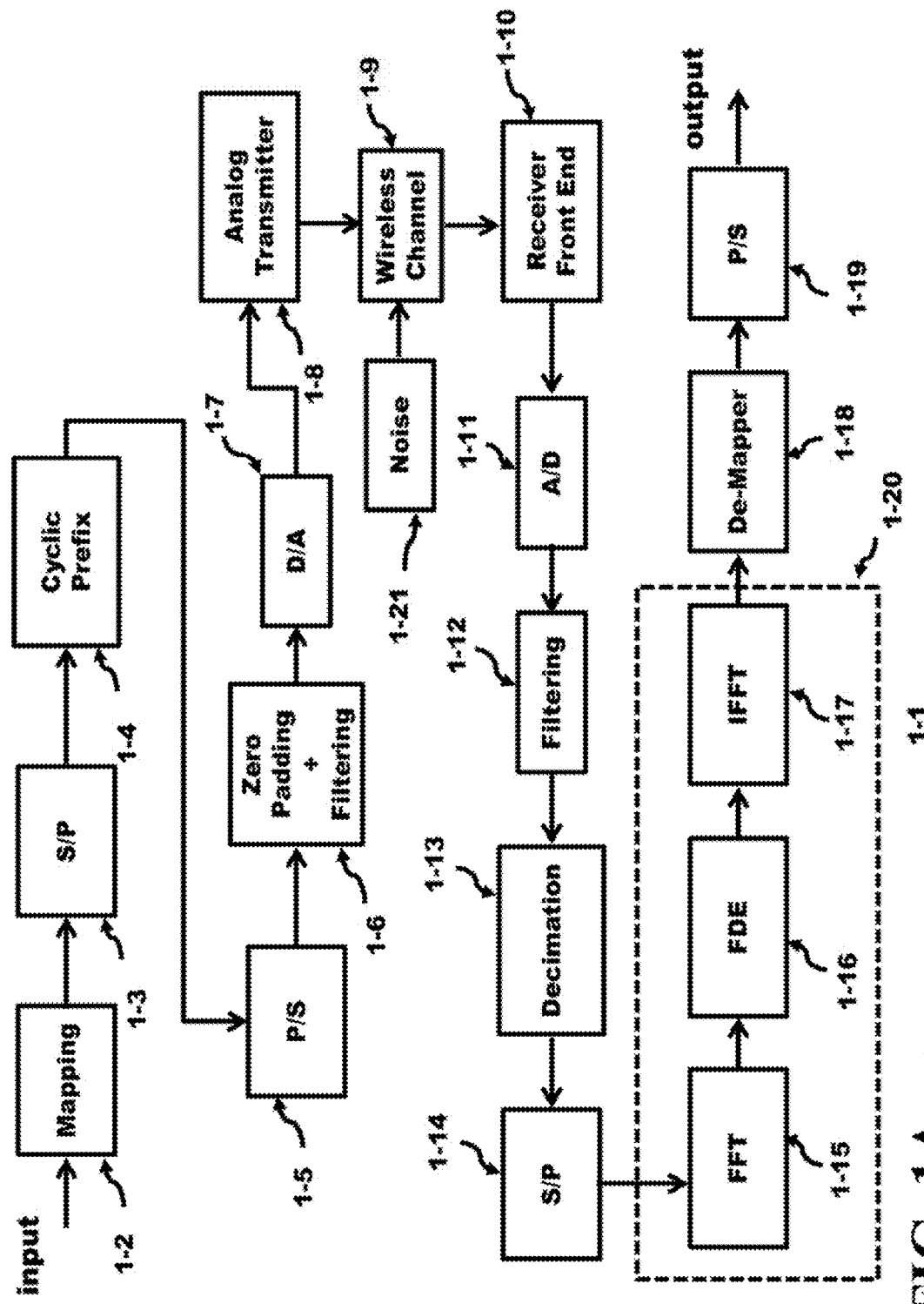
FIG. 1A depicts the transmitter and receiver blocks diagrams for a SC system using a frequency domain equalizer.

The WiGig standard transmits signals at 60 GHz allowing nearly a 10 GHz signal bandwidth capability. A desirable feature is to use directional (unidirectional) antennas at the transmitter to focus the energy to a receiver at a given location. Such a system offers flexibility in use. For example, if the distance between the transmitter and receiver to be either increased, the signal energy of unidirectional antenna allows for an improved Bit Error Rate Test (BERT) when compared to a omnidirectional antenna that is transmitting the same power levels. If the distance between the transmitter and receiver is decreased, then the signal quality improves when compared to an omnidirectional antenna that is transmitting the same power levels.

The directional antennas also offer an additional benefit for 60 GHz transport. Since the spreading of the signal energy is reduced from a directional antenna, reflected signals from structures off the signal path are reduced. A signal with a reduction in reflected signal behaves more as an Additive White Gauss Noise (AWGN) channel. Such a channel has benefits in equalization of the signal due to the noise of the channel. AWGN simplifies the equalization of the received signal since the matrix inversion typically required for the transport at 60 GHz when using an directional antenna, can be performed by a simple low power dissipating TDE instead of a complicated higher power dissipating FDE when the same directional antenna is used. The power saving of performing the equalization of the received signal can be reduced by an order of magnitude if the TDE is used in place of the FDE.

Beamforming can be generated by applying a waveform to two or more antennas. The phase of the waveform applied to each antenna can be adjusted between each other. These waveforms are applied to the antennas to propagate the up-converted signals into free space. The phase relations of the two or more propagated signals or waveforms then cause a constructive or destructive interference between the propagated signals at various locations in space such that a transmitting beam with greater intensity or less intensity, respectively, can be formed at a particular location in free space. Thus, the phase adjustments of the waveforms allow the transmitting beams to be steered and has a narrower beam (focused) depending on the degree of the phase adjustment. The transmitting beams can be steered more accurately as the number of antennas is increased.

As the transmitting beams are focused, several advantages occur: 1) the power delivered to a receiver at a given distance from the transmitter can be increased as the transmitting beam becomes more focused; 2) the multipath signals are reduced as the transmitting beam becomes narrower. Multipath signals are caused by the reflection of the transmitted signal from objects located in the field off the direct path between the transmitting antenna and the receiving antenna. As the transmitting beam narrows, the objects which were within the range of the transmitting beam are now eliminated, thereby decreasing reflection, reducing multipath signals, and the delay spread; and 3) the quality of the signal improves since less intersymbol interference occurs.

In addition, the receiving antenna can use a plurality of antennas to narrow the acceptance of energy from free space creating a narrow receiving beam. The narrow receiving beam prevents extraneous signals not related to the transmitting beam from entering the receiver. Thus, the receiver maximizes the quality of the received signal from the narrow receiving beam.

In single carrier systems, the operation to create blocks causes latency to increase while bandwidth efficiency is decreased because of the addition of the cyclic prefix which transforms the linear channel convolution into a circular one. However, the block level of the signals is required so that the FDE can perform the compensation for each block. The cyclic prefix efficiently eliminates time spreading between the blocks. The time spreading is caused by multi-path propagation of the signal in the wireless channel.

Figure 2:
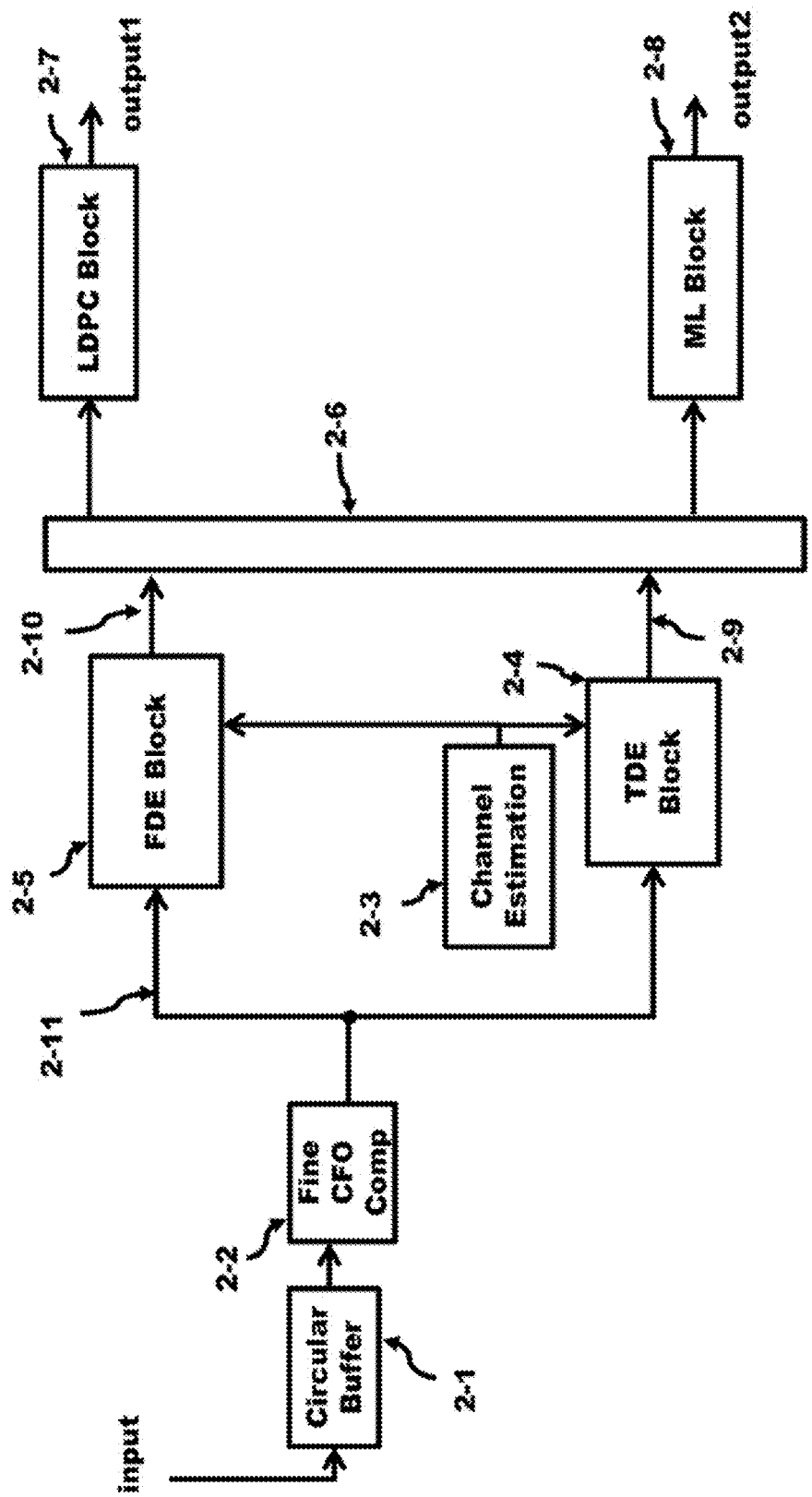
FIG. 2 shows a block diagram of a portion of a receiver.

FIG. 2 presents a block diagram of a portion of the receiver path. The received signals are input into a circular buffer 2-1 which stores the signals. A carrier frequency offset (CFO) Compensation 2-2 compensates for channel time-variation and reduces inter carrier interference. The CFO presents the compensated signals to either the frequency domain equalizer (FDE) block 2-5 or the time domain equalizer (TDE) block 2-4 over the interconnect 2-11. The channel estimation block 2-3 tracks changes of the noisy channel carrying the signal and attempts to predict and compensate for these changes. Both the FDE 2-5 and TDE 2-4 utilize the channel estimation. The channel estimation can determine the quality of the received signal. The outputs (2-10 and 2-9) of the FDE and TDE, respectively, are applied to a mux 2-6 which then applies the signals for further signal processing. After the mux 2-6, the signal can be applied to one of the two processing blocks: the low density parity check (LDPC) block 2-7 or the maximum likelihood block (ML) 2-8. Both of these blocks perform error correction. The output signal is provided at output 1 and output 2, respectively.

The FDE is required when the captured signal comprises many multipath signals (strong multi-path) having a large delay spread. The FDE is required to improve the quality of the signal for delay spreads greater than 3 ns. For weak multipath conditions, where the delay spread is less than 3 ns, the TDE is an appropriate choice since the received signal has less interference and appears more Gaussian in nature allowing a less complicated equalizer to be used. For applications, where the propagating distances between the transmitter and receiver is 2 m, it is highly practical to use TDE with/without LOS. Time domain equalizer has significant good performance versus power dissipation when compared to a frequency domain equalizer with short duration of channel impulse response.

The low density parity check (LDPC) block 2-7 is an error detection block. The LDPC is a well-known linear error code correcting code that approaches the Shannon limit and therefor called a capacity approaching code. The output signal is applied to the baseband circuitry of the receiver to extract the signals from the transmitter. A parity-check decoder allows error correction allows messages which are transmitted over a noisy transmission medium to be captured and recovered at a receiver with a noise threshold that can approach the upper bound of the channel noise. These messages comprise codewords [C] that are generated with additional bits for redundancy. These additional bits are called check bits and are placed in the codewords making each codeword distinct from another codeword. This error recovery decoder is required where the codewords as sent by the transmitter are altered in transit to the receiver. The medium which interconnects the transmitter to the receiver can be noisy and can alter the value of the bits contained within the codewords. An example of a hostile medium is a wireless connection between the transmitter and the receiver. Such a wireless medium suffers from noise of the environment, other transmitters in the local area competing for the limited available spectrum, multiple path reflections from buildings and structures, signal loss, and etc.

The maximum likelihood (ML) block 2-8 is another error detection block. A codeword is sent by the transmitter and a signal is received at the receiver after being distorted by the channel characteristics. The library of codewords are finite, therefore the received signal should match one of the codewords. However, some signals are received with less or no error while other signals have significant error. The error can be measured as hard errors, soft errors, or both. A hard error flips the polarity of the bit while a soft error measures how strongly or weakly the bit has the value of a "1" or "0". The information received over a sequence of bits which also carries redundant bits and can be used to determine the quality of these sequences of bits by using successive approximation techniques. These techniques are used to find the most likely codeword that was sent. The system finds the measured signal out of the library of codewords where the probability of a match is maximized. This is the error correction performed within the maximum likelihood block 2-8.

Figure 3:
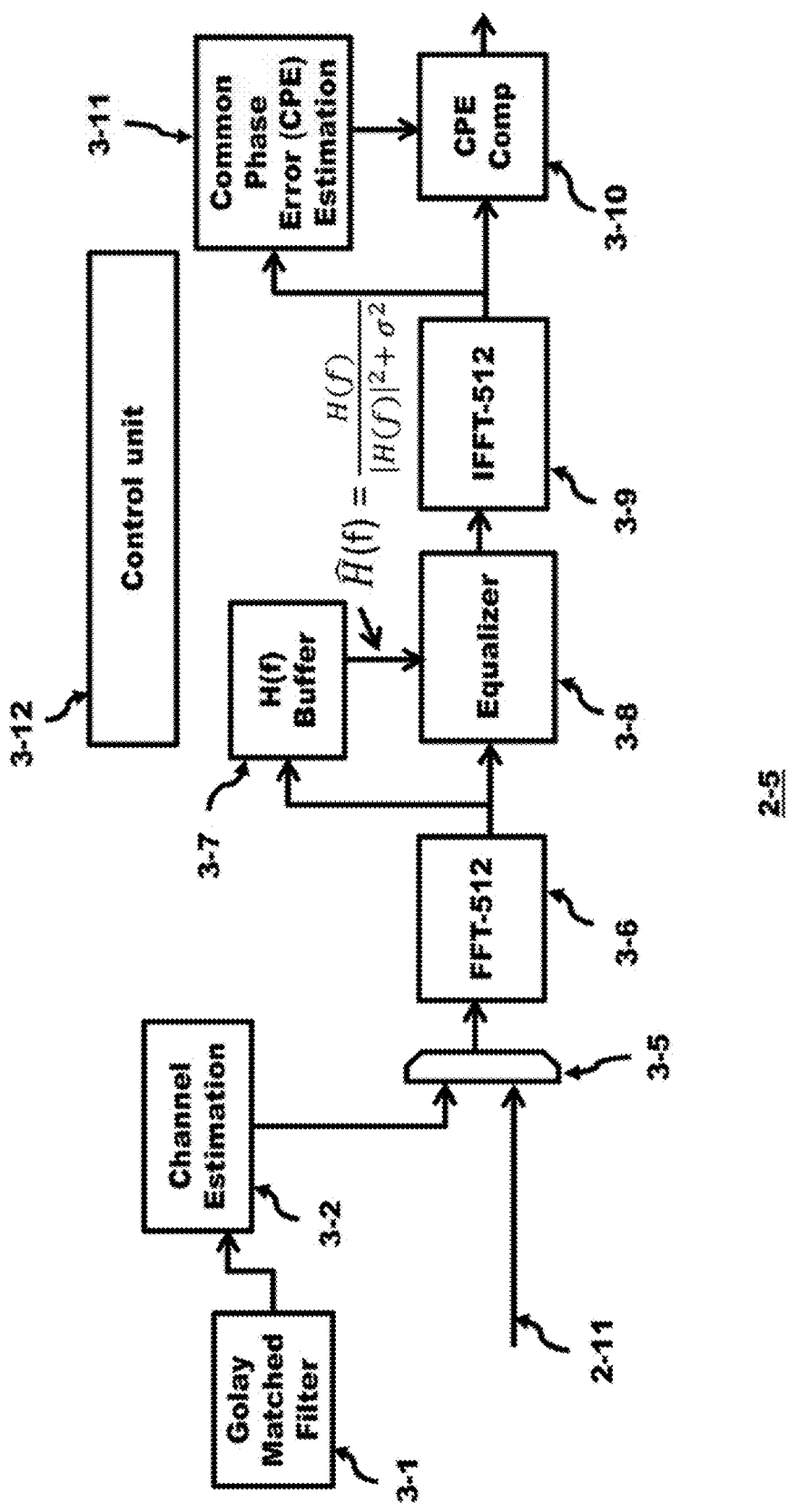
FIG. 3 presents a block diagram of the frequency domain equalizer (FDE) path.

The box 2-5 in FIG. 2 is expanded in FIG. 3 to provide a block diagram of the frequency domain equalizer (FDE). This block diagram is used to determine the transfer equations for the FTT 3-6, equalizer 3-8 and IFFT 3-9. The FDE supports binary phase shift keying (BPSK) and quadrature phase shift keying (QPSK). The system operates on a block of 8 complex points every 64 cycles performing at a rate of 440 MHz/512 points. The FFT 3-6 and IFFT 3-9 are radix-8 butterflies (the IFFT uses conjugate inputs) while the equalizer 3-8 is a multiplier. A time domain signal is applied to the input 2-11 of the FFT-512. In addition, the time domain signal of the channel estimation 3-2 is also applied to the FFT-512. The FFT-512 generates a frequency signal H(f) which is applied to the H(f) buffer 3-7. The output of the H(f) buffer 3-7 is applied to the equalizer 3-8 where σ is the noise in the channel. The frequency transformed signal at the output of the FFT-512 is also applied to the equalizer. The signal at the output of the equalizer is and is applied to the IFFT-512 3-9 to generate the estimated output signal.

A control unit 3-12 provides the control signals for the datapath flow. The channel estimation uses the Golay Matched Filter 3-1 to generate the channel estimation 3-2 of the wireless channel and is also provide to the MUX 3-5. A digital signal (not illustrated) selects one of the two inputs to the MUX. Eight parallel streams of data are applied to the FDE which are sampled each clock tick. These signals are sent to the FFT-512 3-6 which transforms the time domain signals to the frequency domain signals. The FFT-512 3-6 generates a frequency signal H(f) which is applied to the H(f) buffer 3-7. The output of the H(f) buffer 3-7 is applied to the equalizer 3-8. The IFFT-512 3-9 transforms the frequency domain signals of the datapath back to the time domain where the signals are compensated by the CPE Comp 3-10. The time domain signals at the output of the IFFT-512 are also used to estimate the common phase error (CPE) 3-11 which is then applied to the CPE Comp. The SC FDE can perfectly equalize for multipath using a 64-tap delay line. The operation of the FDE requires Interference and Noise power estimation. The FFT and IFFT operation occurs for each transmission block of 512 symbols. The modulation scheme can be binary phase switch keying (BFSK) or quandary phase switch keying (QPSK). The SNR for the FFT and IFFT is about 30 db. The final signals are applied to the QAM demapper and applied to the baseband signal processing elements (not illustrated).

Figure 1B:
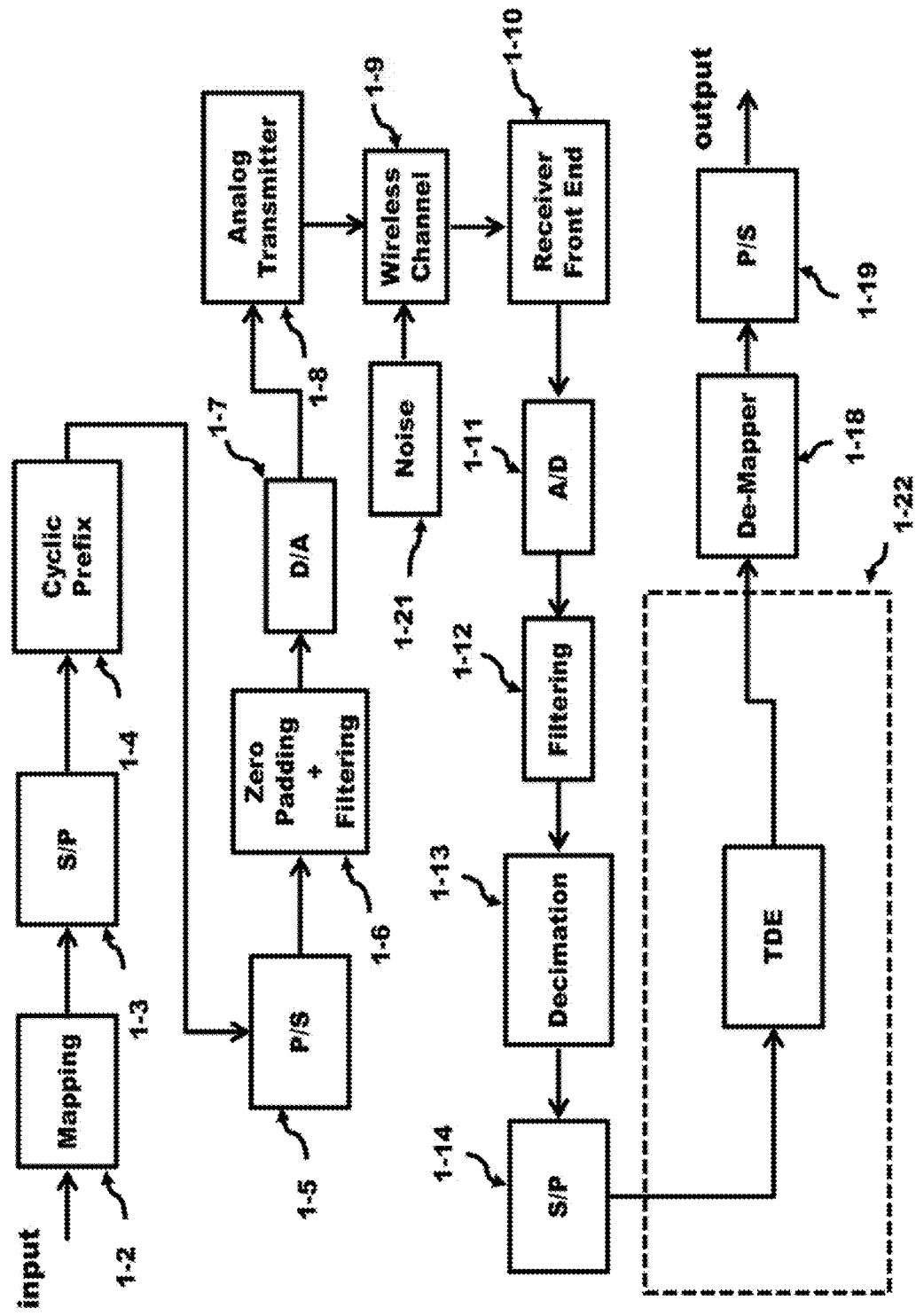
FIG. 1B illustrates the transmitter and receiver blocks diagrams for a SC system using a time domain equalizer.
Figure 4:
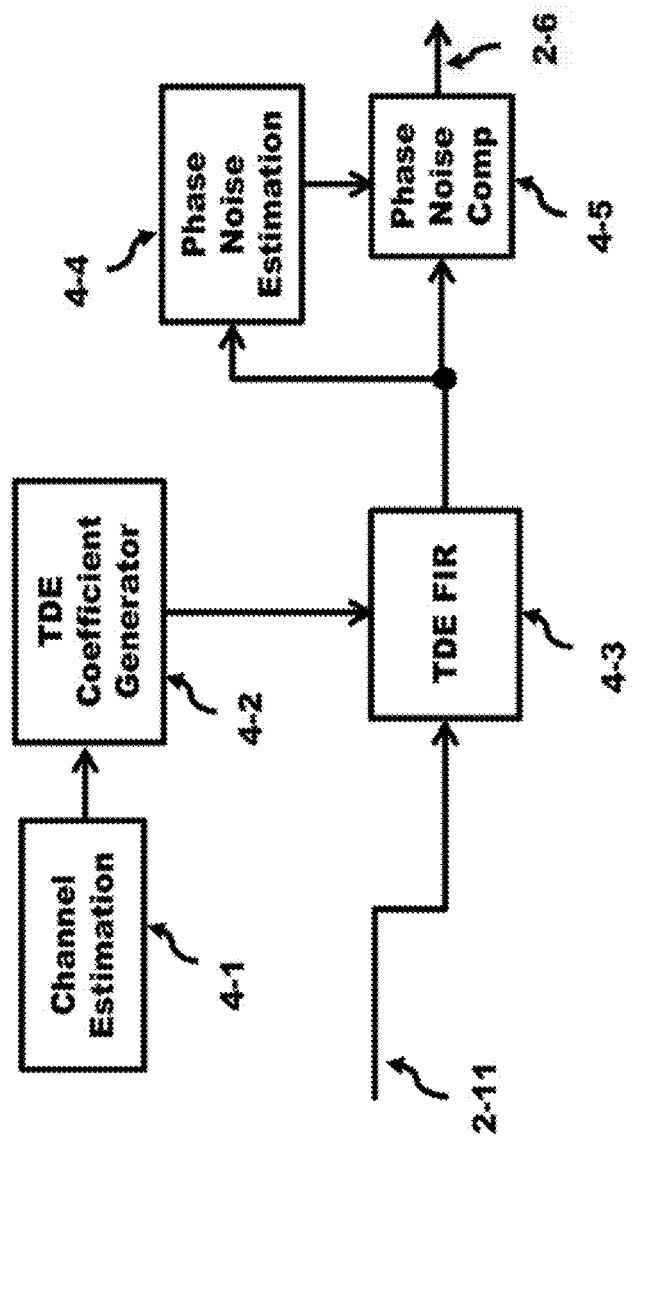
FIG. 4 depicts a block diagram of the time domain equalizer (TDE) path.

The TDE block 2-4 in FIG. 2 is expanded in FIG. 4 to provide a block diagram of the time domain equalizer (TDE). This block diagram is used to determine the transfer equations for the TDE 1-22 illustrated in FIG. 1B. The channel estimator 4-1 feeds information about the channel to the coefficient generator 4-2. The TDE FIR block 4-3 comprising an FIR filter is feed the estimated coefficients and performs a time domain equalization of the input signal. The time domain signals at the output of the TDE-FIR block 4-3 are also used to estimate the common phase noise 4-4 which is then applied to the phase noise compensator block 4-5 to provide the output 2-6.

The time domain channel estimate is used in Parseval' theorem to calculate the estimated signal to noise ratio (SNR). The SNR is used to determine the Error Vector Magnitude (EVM) for the Minimum Mean Square Error (MMSE). The regularized Least Square Problem uses a positive definite matrix. This technique offers several advantages: the solution can be implemented into the CMOS technology providing very accurate and fast results. EVM is a measurement that can determine the performance of a radio receiver. The symbols received by the radio are a series of constellations where the constellation points vary around the ideal value due to carrier leakage, phase noise, delay spread, and other noise sources in the wireless environment. The distance of the measured constellation points from the ideal points can be measured and can be used to determine the EVM. If after the header is decoded, the estimated EMV is not sufficient to decode the packet, then the packet is ignored to save power. If the EMV satisfies a criteria indicating that the error is less than 1% or the delay spread is less than 3 ns, then this information can be used to perform a function. The estimated EMV can be used to switch the processing from the FDE 2-5 block to the TDE block 2-4, when the delay spread is less than 3 ns. Furthermore, the power to the FDE can be disabled so that the overall power dissipation is reduced.

Multipath signals directly impacts the delay spread of the received signal. Walls and other objects off the direct path between the transmitter and receiver reflect the incident energy from the transmitter to the receiver. This causes the receiver to receive copies of the transmitted signal delayed in time from one another. The overall delay from the shortest delay (line of sight between the transmitter and receiver) and the longest delay (the largest path that the signal travels after reflecting from an object) is the delay spread. These reflected signals add to the delay spread which can be multiple 10's of ns. Multipath signals can be reduced by using directional antennas both at the transmitter to focus the beam and at the receiver to narrow the search space; thereby maximizing the line of sight signal and minimizing any reflected signals thereby decreasing one of the noise sources. Furthermore, the power of the beam is more concentrated in the focused beam. This directly impacts the measured value of EVM since the constellation points will be closer to the ideal value.

The table 5-1 in FIG. 5 presents data for the TDE and FDE blocks. The average power dissipation of the TDE is 15 mW while the FDE dissipates 125 mW as given in the first row of 5-1. In both of these measurements, the Phase noise estimation and compensation was excluded, since their power dissipation are comparable. However, if these dissipations are included, the power increases by 15 mW to 30 mW and 140 mW, respectively as presented in the second row. The third row shows that the coefficient generator in the TDE and FDE use 30 mW and 50 mW, respectively. Furthermore the number of gates in the datapath to calculate the TDE versus the FDE is 41K gates versus 400K gates as given in the fourth row. The datapath area of the TDE occupies an area that is a 1/10 of the area of the FDE block. However, the fifth row shows that the area for the coefficient generation for the TDE uses 404K gates making the overall area between the TDE and FDE blocks comparable.

The IEEE 802.1 lad standard defines four different PHY layers: the Control PHY; the SC PHY; the OFDM PHY; and the low-power SC PHY (LPSC PHY). Control PHY is defined by MCS 0. The single carrier (SC) PHY starts at MCS 1 and ends at MCS 12; the orthogonal frequency division modulation (OFDM) PHY starts at MCS 13 and ends at MCS 24; and the low power single carrier (LPSC) PHY starts at MCS 25 and ends at MCS 31. The system described in this specification supports the MCS 1-9 and MCS 25-31; all related to the SC (single carrier) as indicated in the sixth row of table 5-1.

The 802.11ad packets share a common format, the packet comprises a short training field, a channel estimation field, a physical layer convergence procedure (PLCP) header, a MAC packet, and a cyclic redundancy check (CRC). Although there are different PHYs, they all have this unique structure, allowing implementers to use the same type of packet formats when using different PHYs. The only difference between these different PHYs is that each has a different overall packet size and use a different Golay code. Both the TDE and FDE are operated at a core clock rate of 440 MHz where each supports a maximum throughput of 2.5 Gbps data rate as indicated in rows 7-8 of table 5-1.

Beamforming offers several benefits. Beamforming narrows the propagating electromagnetic signals from the transmitter to be within a range of +/−30 degree from the center maximum beam at 0 degrees. The same antenna design can also be used by the receiver to select the propagating electromagnetic signals that are being received within a range of +/−30 degrees. The antenna design can form the beam to be maximized within the angular range and is known as beamforming. Using beamforming antenna improves the selectivity of signals and reduces the possibility of picking up reflected electromagnetic signals. A receiver using a beamformed antenna can selectively receive electromagnetic signals. These received signals can have an average root mean square (RMS) delay spread of less than 3 ns for 2 m or below. A TDE can be used to easily extract the symbols from the received electromagnetic signal with a low delay spread. Since the FDE consumes approximately 125 mW average power while the TDE consumes approximately 15 mW average power with 8-Tap FIR. There would be a 110 mW power saving to use the TDE as compared to using the FDE. The FDE is used when there is a strong multipath condition causing a large delay spread. However, the TDE offers adequate equalization for the weak multipath condition and offers a significant reduction in power dissipation. For applications where the distance between the transmitter and receiver is 2 m, it is highly practical to use TDE with/without LOS.

Figure 6:
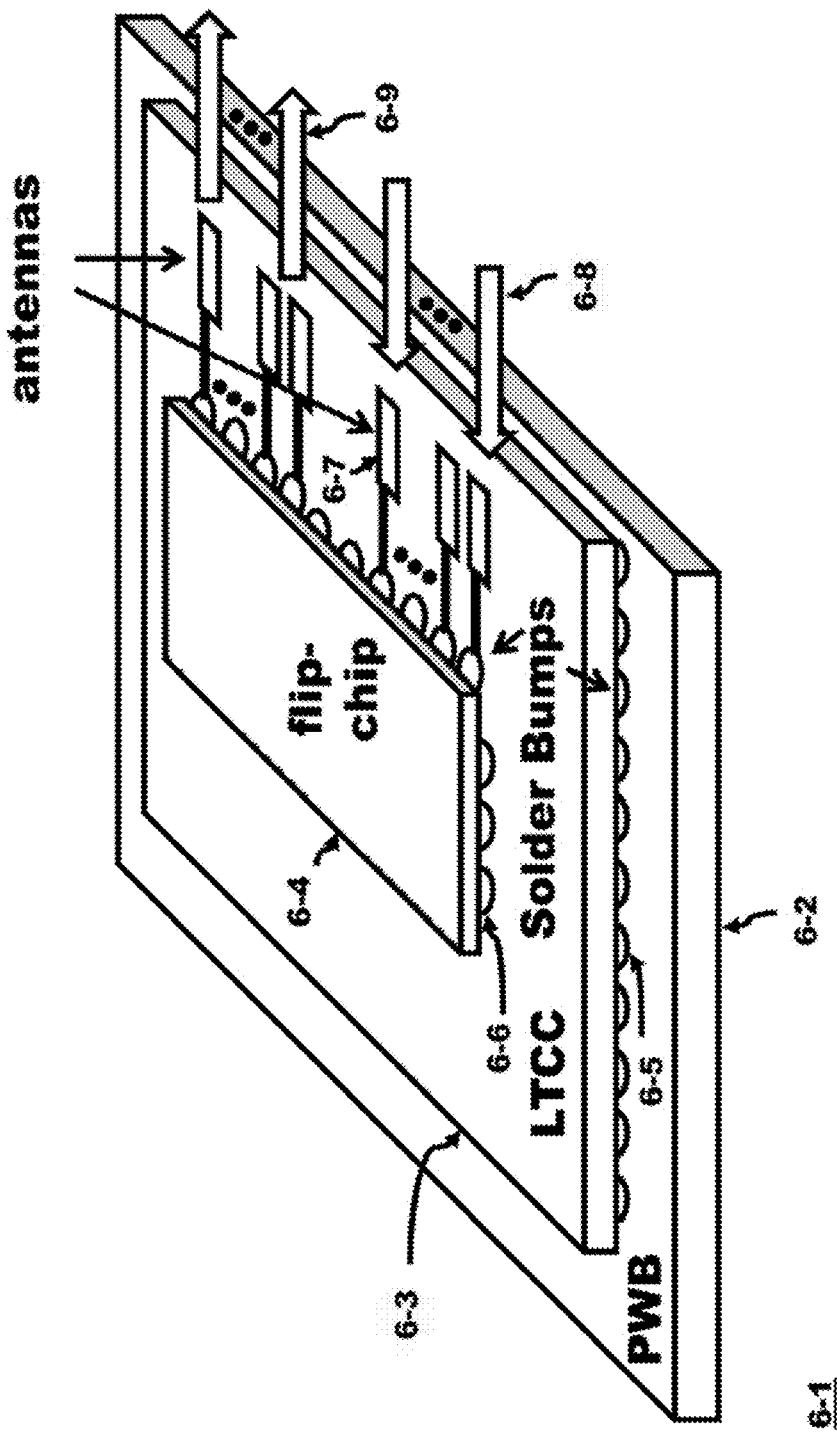
FIG. 6 illustrates presents a 3-D representation of the chip containing the beamforming transmitters solder bumped to an LTCC (Low Temperature Ceramic Carrier) substrate which is further solder bumped to a PWB (Printed Wiring Board) board in accordance with the present invention.

FIG. 6 presents a 3-D representation 6-1 of the chip 6-4, Low Temperature Co-fired Ceramic (LTCC) substrate 6-3 and Printed Wire Board (PWB) 6-2. The chip 6-4 is solder bumped 6-6, flipped and attached to the top of the LTCC substrate 6-3. The LTCC substrate 6-3 has antennas 6-7 fabricated on its top and bottom surfaces for transmitting and receiving signals to other transceivers in free space. The bottom of the LTCC substrate 6-3 is solder bumped 6-5 to the PWB 6-2. Some of the antennas are used to capture input signals 6-8 from free space or to send out signals 6-9 out to free space. The transmit antennas can use the techniques mentioned in this specification to provide a system of distributing the LO, generating phase rotations, amplification with a class-E amplifier to steer the output waveform into a beam. See U.S. applications, Pat. App. No. 20140043104 entitled "Method and Apparatus for a Clock and Signal Distribution Network for a 60 GHz Transmitter System" filed on Aug. 10, 2012, and Pat. App. No. 20140043101 entitled "Method and Apparatus for a Class-E Load Tined Beamforming 60 GHz Transmitter" filed on Aug. 10, 2012, which are both assigned to the same assignee as the present application and incorporated herein by reference in its entirety.

Figure 7A:
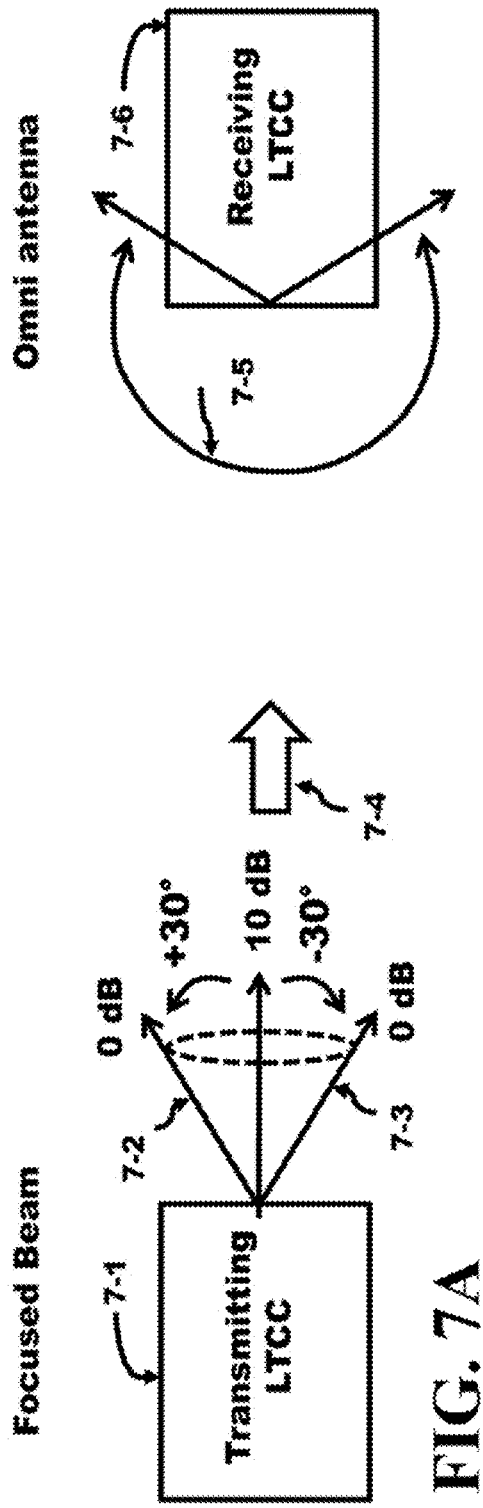
FIG. 7A depicts an Omni-antenna receiving a focused transmitter beam from a transmitter in accordance with an embodiment of one of the present invention.

The transmitting LTCC in FIG. 7A corresponds to transmitting signal 6-9 of FIG. 6 where a top view of the LTCC substrate 7-1 is illustrated. The transmitter uses a focused beam antenna where maximum power is 10 dB perpendicular out of the far end and drops down to 0 dB+/−30° in the azimuth rotational angle 7-2 and 7-3. The arrow 7-4 indicates the propagation path for the focused beam of transmitter 7-1. Assume the receiving LTCC 7-6 has an omni-antenna and therefore is not directional selective antenna. This antenna picks up electromagnetic wave signals over a wide angular spread 7-5. This wide angle ability allows other undesired 60 GHz signals to be captured and degrade the desired signal quality.

Figure 7B:
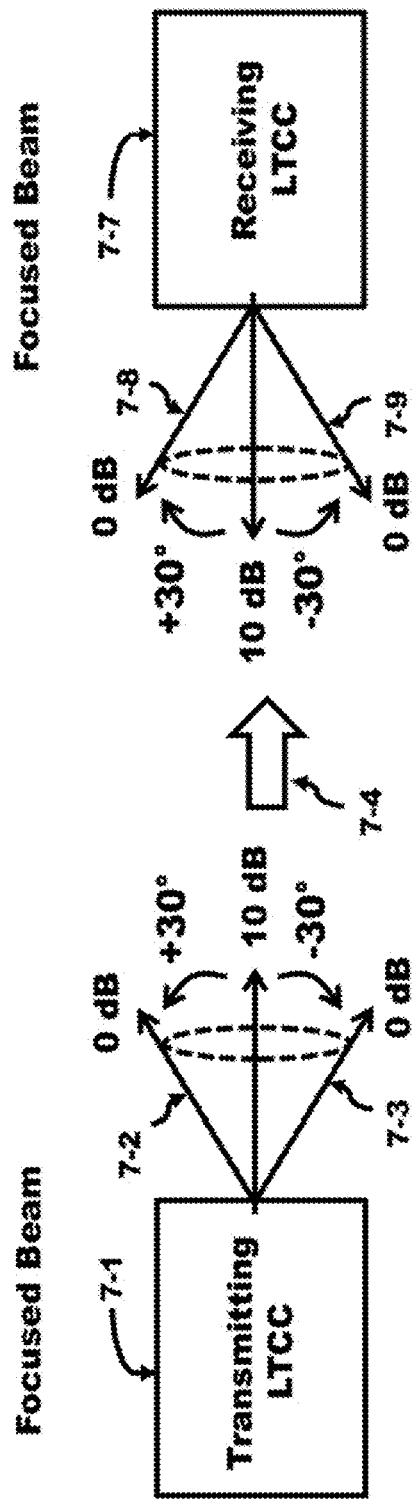
FIG. 7B shows a focused receiver beam antenna receiving a focused beam from a transmitter in accordance with an embodiment of one of the present invention.

FIG. 7B illustrates the same system as provided in FIG. 7A with the exception that a focused beam receiver is used in place of the Omni-receiver antenna given in FIG. 7A. The structure of the focused beam transmitter antenna is equivalent to the structure of the focused beam receiver antenna. The receiving LTCC 7-7 has a focused beam antenna and therefore is a selective antenna. This antenna picks up electromagnetic wave signals over a narrow spread between the rays of 7-8 and 7-9. The signal drops to 0 dB at these edges while the electromagnetic wave signal can be received at 0 degrees with 10 dB more power. For more information, see U.S. applications, Pat. App. No. 2014/0024328 entitled "Method and Apparatus for the Alignment of a 60 GHz Endfire Antenna" filed on Jul. 19, 2012, and Pat. App. No. 20140022135 entitled "Method and Apparatus for a 60 GHz Endfire Antenna" filed on Jul. 19, 2012, which are both assigned to the same assignee as the present application and incorporated herein by reference in its entirety.

The system in FIG. 7B offers beamforming with both a +/−30 degree transmit (TX) capability and +/−30 degree receive (RX) capability, where the average rms delay spread is less than 3 ns for distances of 2 m or below. The FDE consumes about 125 mW average power, while the TDE consumes about 15 mW average power using an 8-Tap FIR. The system automatically switches over from the FDE to the TDE when the error vector magnitude (EVM) of the signal is measured with a delay spread less than or equal to 3 ns. The FDE is used when there is a strong multipath condition causing a large delay spread. However, the TDE offers adequate equalization for the weak multipath condition and offers a significant reduction in power dissipation. Once the switch is performed for weak multi-path conditions, there is a 110 mW power saving to use TDE compared to FDE. The decision to switch between FDE and TDE is based on the error vector magnitude (EVM) of the signal. The received signal is equalized by both the FDE and the TDE. When the EVM of the TDE is found to have an error rate of less than 1%, then the system switches to the TDE and powers down the FDE. This error rate corresponds to a delay spread of 3 ns or less. This reduces the power dissipates of the chip from 125 mW to 15 mW. This is a significant amount of power to save which increase the battery life.

The transport payload of the signal received by the system is partitioned into fields. The partitions include the short training field, the channel estimation field, and the physical layer convergence procedure (PLCP) header which help determine automatic gain control, signal acquisition, and predicting the characteristics of the channel coupling the transmitter to the receiver. The characteristics of the channel can be used to determine the when to switch from the FDE to the TDE. Thus, the channel estimation field can be effectively used to find the number of multi-paths that are being received which in turn can be used to determine the EVM. Typically, when the delay spread of the received signal is 5 ns or greater, the FDE is the better choice to equalize the channel signal. However, if the delay spread is less than 5 ns, preferably 3 ns or less, the TDE is a better choice to equalize the captured signal. The PLCP header provides the data rate by reading the MCS and by knowing the data rate and the EVM, a decision can be made to perform the switch between the FDE and TDE.

Figure 8:
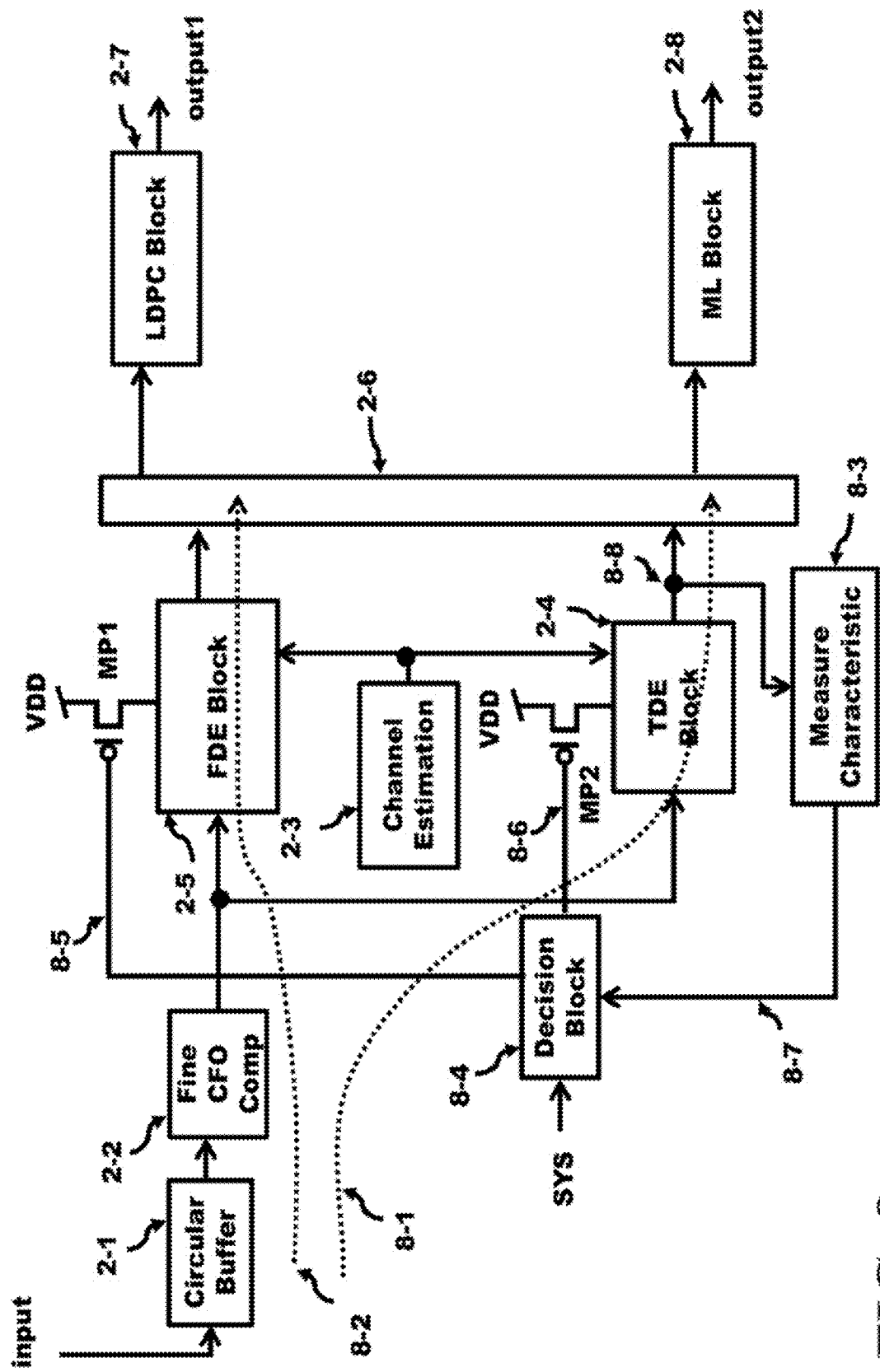
FIG. 8 depicts a block diagram of the switch selecting one of two different path flows via the selection of enabling/disabling a power supply path in accordance with an embodiment of one of the present inventions.

FIG. 8 is similar to FIG. 2, except for the added embodiments of the blocks and transistors. The measure characteristic block 8-3 measures a characteristic of the input signal after being processed by the TDE block 2-4. A parameter 8-7 of the measured characteristic is applied to the decision block 8-4 which compares the parameter with a first value. This first value can be stored in a local memory or provided by the system via the system bus SYS. If the value of the parameter is less than or equal to the first value, node 8-5 is set high disabling the transistor MP1 which disables the FDE block 2-5 from receiving power from one of the power supplies, in this case VDD. Similar circuit connections can be made if the opposite polarity transistors were used coupled to the power supply VSS. This causes the FDE block to be disabled and will not draw power. Simultaneously, node 8-6 will remain low keeping the transistor MP2 enabled and allowing the TDE block to draw power from the power supply VDD and operate; thereby keeping the TDE block active and operational. On the other hand, if the value of the parameter is more than the first value, node 8-5 is set low enabling the transistor MP1 which provides power to the FDE block 2-5 from one of the power supplies, in this case VDD. Simultaneously, node 8-6 will be high disabling the transistor MP2 and prevents the TDE block from drawing power from the power supply VDD; thereby keeping the TDE block disabled and not drawing power. The decision block 8-4 can also be controlled by the system via the system bus SYS to enable or disable both nodes 8-5 and 8-6 in any configuration depending on system requirements.

In one example, the TDE block 2-4 processes the input signal and generates a measurable characteristic of the signal flow 8-1 at node 8-8 which is applied to the measure characteristic block 8-3. If the measure characteristic block 8-3 measures an error rate of less than or equal to the first value of 1%, as determined by the decision block 8-4, then the system maintains the TDE enabled (keeps the TDE block powered) but powers down the FDE block. This reduces the power dissipation of the chip by as much as 125 mW since the TDE only dissipates 15 mW (see Table 5-1). This is a significant amount of power to save which will increase the battery life. The transistors behave as switches and become enabled or disabled depending on the polarity of the nodes 8-5 and 8-6. The switch can be an actual switch (formed using transmission gates or transistors) or a virtual switch which controls the power being enabled or disabled to the FDE or TDE blocks (as by a gated clock), respectively. If the EVM indicates a weak multi-path (low delay spread, about 3 ns), then the transistor MP2 (switch) is enabled and the connectivity of the power supply to the TDE is maintained. However, the power being applied to the FDE block is disabled via transistor MP1 (another switch). This configuration saves 115 mW of power dissipation. If the EVM increases and indicates a larger delay spread, the transistors MP2 and MP1 switch states which disables the connectivity of the TDE to the power supply and enables the power being applied to the FDE block. The path 8-2 is then used to perform the equalization.

Figure 9:
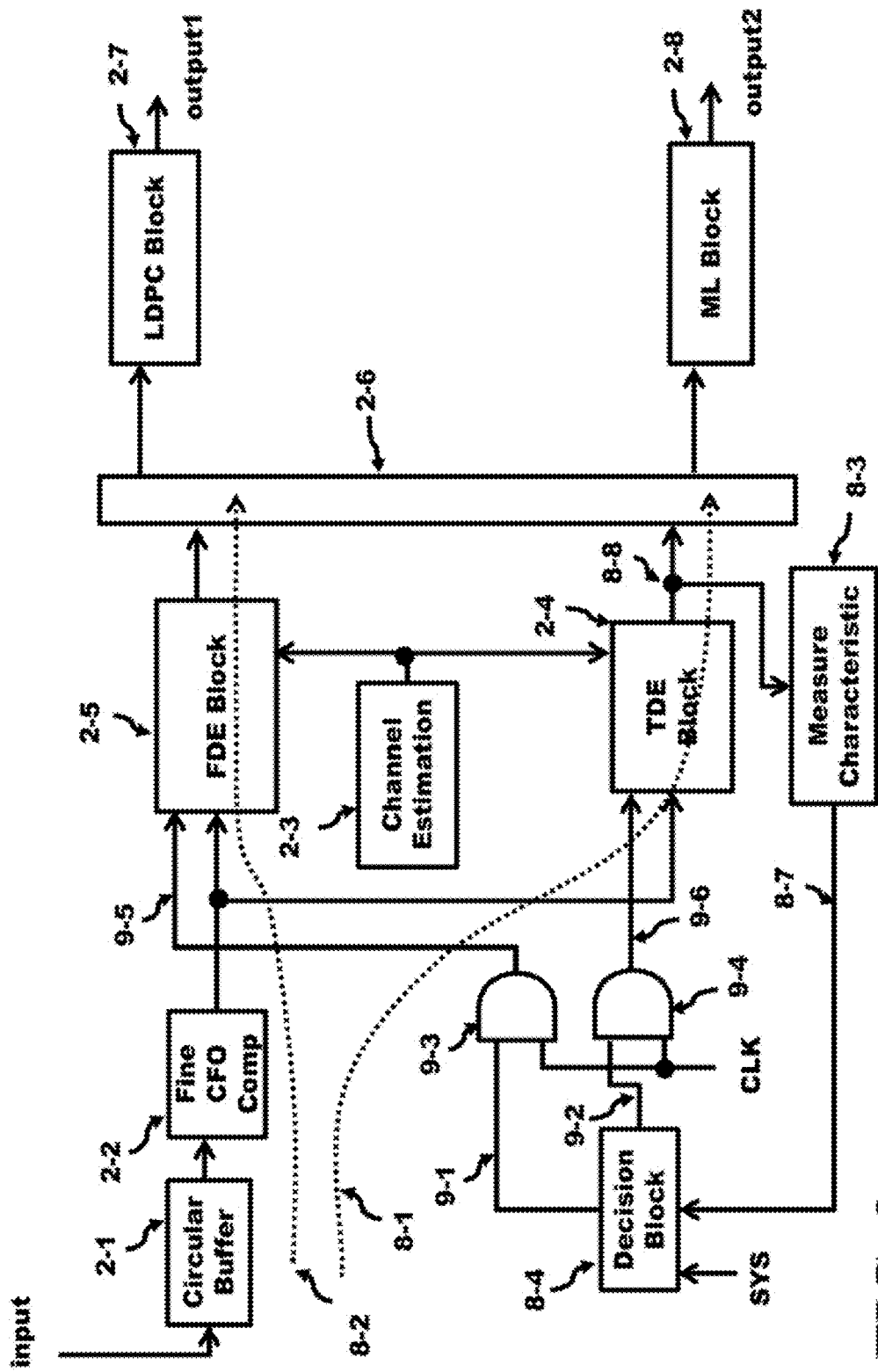
FIG. 9 depicts a block diagram of the switch selecting one of two different path flows via the selection of enabling/disabling by a clocked logic gate in accordance with an embodiment of one of the present inventions.

FIG. 9 is similar to FIG. 8, except for the added embodiments of the clocked gates and clocking system CLK. The measure characteristic block 8-3 measures a characteristic of the input signal after being processed by the TDE block 2-4. A parameter 8-7 of the measured characteristic is applied to the decision block 8-4 which compares the parameter with a first value. This first value can be stored in a local memory or provided by the system via the system bus SYS. If the value of the parameter is less than or equal to the first value, node 9-1 is set low causing the output of the AND gate 9-3 to remain low which disables the FDE block 2-5 from receiving a clock signal CLK on node 9-5. Similar circuit connections with different logic polarities can be made if a different logic gate (for example, an OR gate) were used instead of an AND gate. The FDE block 2-5 becomes static (disabled) holding state at all nodes since the block is not clocked. Furthermore, since the blocks are fabricated using CMOS technology, it is well-known that this is a low power state for a CMOS system, barring the well-known leakage current. Therefore, the FDE block will effectively not draw power since this block is not being clocked. Simultaneously, node 9-2 will remain high enabling the AND gate 9-4 providing a clock signal CLK on node 9-6. The TDE block being clocked keeps the TDE block active and operational. On the other hand, if the value of the parameter is more than the first value, node 9-2 is set low disabling the AND gate 9-4, and meanwhile node 9-1 is set high enabling the AND gate 9-3. The clock CLK is then provided to the FDE block 2-5 on node 9-5. The decision block 8-4 can also be controlled by the system via the system bus SYS to enable or disable both nodes 9-1 and 9-2 in any configuration depending on system requirements.

Another example occurs when the TDE block 2-4 processes the input signal and generates a measurable characteristic of the signal flow 8-1 at node 8-8 which is applied to the measure characteristic block 8-3. If the measure characteristic block 8-3 measures an error rate of less than or equal to the first value of 1%, as determined by the decision block 8-4, then the system maintains the TDE enabled (keeps the TDE block clocked) and powers down the FDE block (blocks the clock). This reduces the power dissipates of the chip by as much as 125 mW while the TDE only dissipates 15 mW. This is a significant amount of power to save which increases the battery life. The clocked logic gates behave as switches and become enabled or disabled depending on the polarity of the nodes 9-1 and 9-2. If the EVM indicates a weak multi-path (low delay spread), then the AND gate 9-4 (switch) is enabled and the clocking to the TDE is maintained. While, the clock being applied to the FDE block is disabled via the AND gate 9-3 (another switch). This configuration saves 115 mW of power dissipation. If the EVM increases and indicates a larger error rate, the AND gates 9-3 and 9-4 switch states which disables the clocking to the TDE and enables the clocking being applied to the FDE block. The path 8-2 is then used to perform the equalization.

Finally, it is understood that the above descriptions are only illustrative of the principle of the current invention. Various alterations, improvements, and modifications will occur and are intended to be suggested hereby, and are within the spirit and scope of the invention. This invention may, however, be embodied in many different forms and should not be construed as limited to the embodiments set forth herein. Rather, these embodiments are provided so that the disclosure will be thorough and complete, and will fully convey the scope of the invention to those skilled in the arts. It is understood that the various embodiments of the invention, although different, are not mutually exclusive. In accordance with these principles, those skilled in the art may devise numerous modifications without departing from the spirit and scope of the invention. In addition, a network and a portable system can exchange information wirelessly by using communication techniques such as Time Division Multiple Access (TDMA), Frequency Division Multiple Access (FDMA), Code Division Multiple Access (CDMA), Orthogonal Frequency Division Multiplexing (OFDM), Ultra Wide Band (UWB), Wi-Fi, WiGig, Bluetooth, etc. The network can comprise the phone network, IP (Internet protocol) network, Local Area Network (LAN), ad hoc networks, local routers and even other portable systems.

What is claimed is:

1. An apparatus, comprising:
    a time-domain equalizer configured to perform time-domain equalization of an unequalized input signal;
    a frequency-domain equalizer configured to perform frequency-domain equalization of the unequalized input signal;
    a measure-characteristics block coupled to the time-domain equalizer and configured to measure a characteristic of an equalized signal output by the time-domain equalizer; and
    a first switch configured to disable or enable the frequency-domain equalizer from drawing power from a power supply if a measurable characteristic of the equalized signal meets a predetermined threshold criterion.

2. The apparatus of claim 1, wherein said first switch is either a series transistor coupling the frequency-domain equalizer to the power supply or a clocked logic gate clocking the frequency-domain equalizer.

3. The apparatus of claim 1, further comprising: a second switch configured to disable or enable the time-domain equalizer from drawing power from the power supply; and a decision block coupled to the first switch and the second switch, wherein if the measurable characteristic meets the predetermined threshold criterion, then the decision block is configured to enable the first switch to permit the frequency-domain equalizer to draw power from the power supply and disable the second switch.

4. The apparatus of claim 1, wherein the measurable characteristic is a measured error of an Error Vector Magnitude (EVM), and the predetermined threshold criterion is 1%.

5. The apparatus of claim 1, wherein the measurable characteristic is a measured time of a delay spread and the predetermined threshold criterion is 3 ns.

6. The apparatus of claim 5, wherein the delay spread is reduced by using at least one directional antenna.

7. An apparatus, comprising:
    a time-domain equalizer configured to perform time-domain equalization of an unequalized input signal;
    a frequency-domain equalizer configured to perform frequency-domain equalization of the unequalized input signal;
    a measure-characteristics block coupled to the time-domain equalizer and configured to generate a measurable characteristic of an equalized signal output by the time-domain equalizer; and
    a first switch configured to disable or enable power coupled to the frequency-domain equalizer if the measurable characteristic comprises an Error Vector Magnitude (EVM) and indicates a delay spread less than or equal to 3 ns.

8. The apparatus of claim 7, wherein said first switch is either a series transistor coupling the frequency-domain equalizer to a power supply or a clocked logic gate clocking the frequency-domain equalizer.

9. The apparatus of claim 7, further comprising: a second switch configured to disable or enable the time-domain equalizer from drawing power from a power supply, wherein if the measurable characteristic indicates delay spread more than 3 ns, then the first switch enables the frequency-domain equalizer to draw power from the power supply and the second switch disables the time-domain equalizer from drawing power from the power supply.

10. The apparatus of claim 7, wherein the delay spread is determined after the time-domain equalizer performs a computation using a channel estimation field and a physical layer convergence procedure (PLCP) header within a packet of an input signal.

11. The apparatus of claim 7, wherein the delay spread is reduced by using at least one directional antenna.

12. The apparatus of claim 7, wherein the delay spread is reduced by using a focused beam antenna system.

13. A method, comprising:
    coupling an input signal to an input node of a time-domain equalizer and a frequency-domain equalizer;
    measuring a characteristic of an equalized signal after being processed by the time-domain equalizer; and
    disabling power coupled to the frequency-domain equalizer if an Error Vector Magnitude (EVM) of the characteristic has an error of less than or equal to 1%.

14. The method of claim 13, wherein if the EVM has error more than 1%, then enabling the frequency-domain equalizer to draw power and disabling the time-domain equalizer from drawing power.

15. The method of claim 14, wherein the enabling and the disabling are performed by a switch, wherein the switch is a series transistor coupling the frequency-domain equalizer to a power supply or a clocked logic gate clocking the frequency-domain equalizer.

16. The method of claim 13, wherein a delay spread is determined after the time-domain equalizer performs a computation using a channel estimation field and a physical layer convergence procedure (PLCP) header within a packet of the input signal.

17. The method of claim 16, wherein the delay spread is reduced by using at least one directional antenna.

* * * * *